United States Patent [19]

Hilterhaus

[11] Patent Number: 4,871,829
[45] Date of Patent: Oct. 3, 1989

[54] ORGANOMINERAL PRODUCTS, A PROCESS FOR THEIR MANUFACTURE AND THEIR USE

[75] Inventor: Karl-Heinz Hilterhaus, Georgsmarienhutte, Fed. Rep. of Germany

[73] Assignees: KVT Kunststoffverfahrenstechnik GmbH & Co.; F. William GmbH & Co., both of Dortmund, Fed. Rep. of Germany

[21] Appl. No.: 322,525

[22] Filed: Mar. 13, 1989

Related U.S. Application Data

[62] Division of Ser. No. 741,342, Jun. 5, 1985, Pat. No. 4,827,005.

[30] Foreign Application Priority Data

Jun. 6, 1984 [DE] Fed. Rep. of Germany ....... 3421086

[51] Int. Cl.$^4$ ...................... C08G 18/08; C08G 18/16; B32B 27/00; B32B 27/40
[52] U.S. Cl. ................................. 528/48; 106/287.16; 428/423.1
[58] Field of Search ................ 106/287.16; 428/423.1; 528/48; 427/387

[56] References Cited

U.S. PATENT DOCUMENTS

| | | | |
|---|---|---|---|
| 3,555,109 | 1/1971 | Getson | 260/825 |
| 3,607,794 | 9/1971 | Abbotson et al. | 260/2.5 A |
| 3,634,342 | 1/1972 | Boblitt | 260/2.5 |
| 3,841,102 | 10/1974 | Cinner et al. | 61/35 |
| 3,865,600 | 2/1975 | Pearson et al. | 106/84 |
| 3,983,081 | 9/1976 | Dieterich et al. | 260/2.5 AJ |
| 4,052,347 | 10/1977 | Dieterich et al. | 260/2.5 AK |
| 4,064,154 | 12/1977 | Chandra et al. | 260/448.2 E |
| 4,097,422 | 6/1978 | Markusch | 260/2.5 AK |
| 4,097,423 | 6/1978 | Dieterich | 260/2.5 AK |
| 4,104,294 | 8/1978 | Grose et al. | 260/448 C |
| 4,105,594 | 8/1978 | Dieterich et al. | 521/100 |
| 4,129,696 | 12/1978 | Markusch et al. | 521/154 |
| 4,136,238 | 1/1979 | Hilterhaus et al. | 521/107 |
| 4,156,060 | 5/1979 | Blount | 528/48 X |
| 4,247,708 | 1/1981 | Tsutsumi et al. | 556/456 |
| 4,252,919 | 2/1981 | Wagner et al. | 525/418 |
| 4,307,980 | 12/1981 | Meyer et al. | 405/264 |
| 4,346,192 | 8/1982 | Blount | 524/778 |
| 4,350,775 | 9/1982 | Blount | 521/100 |
| 4,467,081 | 8/1984 | Chang et al. | 528/26 |
| 4,475,847 | 10/1984 | Cornely et al. | 405/264 |
| 4,596,838 | 6/1986 | Andreichuk | 523/130 |
| 4,669,919 | 6/1987 | Hilterhaus et al. | 405/264 |

FOREIGN PATENT DOCUMENTS

| | | |
|---|---|---|
| 637889 | 3/1962 | Canada . |
| 000579 | 2/1979 | European Pat. Off. . |
| 56145 | 7/1982 | European Pat. Off. . |
| 1770384 | 10/1971 | Fed. Rep. of Germany . |
| 1784458 | 10/1971 | Fed. Rep. of Germany . |
| 1758185 | 11/1972 | Fed. Rep. of Germany . |
| 2325090 | 11/1974 | Fed. Rep. of Germany . |
| 2359609 | 6/1975 | Fed. Rep. of Germany . |
| 2460834 | 6/1976 | Fed. Rep. of Germany . |
| 2518192 | 11/1976 | Fed. Rep. of Germany . |
| 2542279 | 4/1977 | Fed. Rep. of Germany . |
| 2908746 | 9/1980 | Fed. Rep. of Germany . |
| 1419552 | 10/1965 | France . |
| 1564346 | 4/1969 | France . |
| 1275941 | 6/1972 | United Kingdom . |
| 1445940 | 8/1976 | United Kingdom . |

OTHER PUBLICATIONS

R. Stahl, "Das Verfestigen des Kohlenbeins untenhalb der Kopfstrecke in Mannlosen Streben mit Polyurethanschaumen", Gluckauf, 104, pp. 666-670, (1968).

F. Meyer, "Polyurethan zum Verfestigen von Kohle und Nebengestein", Bergbau, 4, pp. 125-129, (1977).

H. Maurer, "Die Anwendung von Polyurethan in der Austrichtung und in der Vorrichtung", Gluckauf, 113, pp. 707-711, (1977).

Primary Examiner—Michael Lusignan
Attorney, Agent, or Firm—James F. Haley, Jr.; Denise L. Loring; Kenneth H. Sonnenfeld

[57] ABSTRACT

The invention relates to organomineral products of high strength obtainable by reacting a polyisocyanate in an aqueous alkali silicate solution in the presence of a catalyst prompting the trimerization of the polyisocyanate. In preparing them, the catalyst is used in an amount of 5.5 to 14.5 mmole per mole of NCO groups in the reaction mixture. The organo-mineral products of the invention are suitable as construction, coating, sealing or insulating materials or as putty or adhesives.

1 Claim, 2 Drawing Sheets

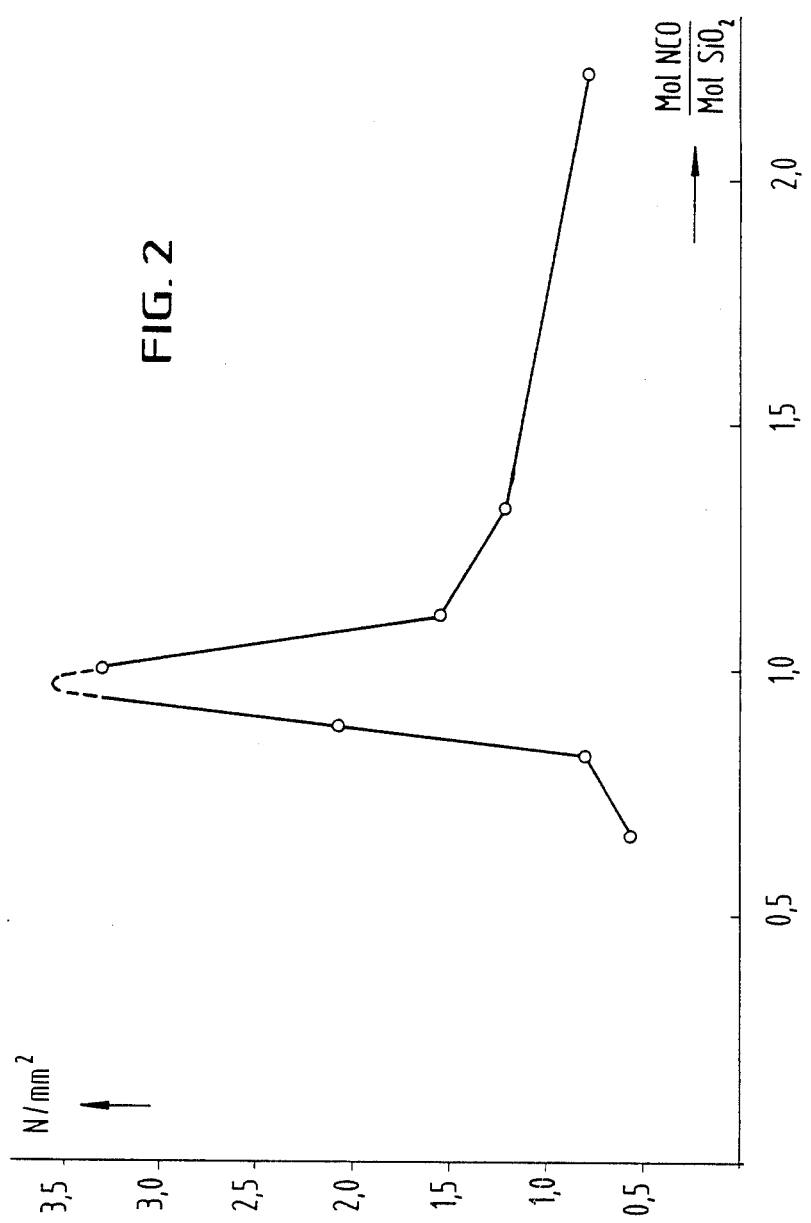

ORGANOMINERAL PRODUCTS, A PROCESS FOR THEIR MANUFACTURE AND THEIR USE

This is a division, of application Ser. No. 741,342, filed June 5, 1985, now U.S. Pat. No. 4,827,005, entitled ORGANOMINERAL PRODUCTS, A PROCESS FOR THEIR MANUFACTURE AND THEIR USE.

BACKGROUND OF THE INVENTION

There have been known processes for preparing porous (expanded) and non-porous organomineral products by reacting polyisocyanates with aqueous alkali silica solutions (water glasses); see DE-A17 70 384, DE-A-24 60 834 and EP-P-0 000 579. These processes preferably use alkaline, dissolved water glasses having different solids contents and $Me_2O/SiO_2$ ratios. To produce a change in the properties of the water glasses or the products resulting therefrom, most simply, the water glasses are mixed with organic additives that are preferably soluble and can be admixed in liquid state. Examples of additives are hardening substances, such as formamide, glyoxal, stabilizers, such as formaldehyde solutions and elasticizing substances, such as certain epoxide resins and polyethers.

More complicated processes for preparing organomineral products make use of mixtures of water glass solution and preparations containing reactive NCO groups with or without additional modifiers causing the components to undergo a chemical reaction when being mixed. The end products thus obtained can be porous or non-porous. Depending on the formulation (blowing agent), the products obtained are expanded foams with low compression strength or non-expanded organomineral products; see FR-A-1,419,552, US-A-3,634,342, GB-A-1,445,940 and DE-A-23 59 609.

The products of these processes have been proposed for use in the most different industries as putty, adhesives, insulating material against high or low temperatures and for sound protection, coating and sealing material, for instance against water. While in view of their low price and their special properties as inorganic-organic products, their importance is increasing, their applications are limited, especially those of the non-expanded products, in view of their insufficient mechanical strength. For instance, known non-expanded products, only show insufficient tensile bending strength after 2 hours at 50° C. After 8 days, they still show tensile bending strength values that are lower than the corresponding values of purely organic products.

When taking a closer look at reaction systems consisting of water glass solutions and NCO-group bearing preparations, the difficulties in the formulation will become apparent. On the one hand, the complicated chemical reaction scheme has to be made controllable operation-wise. On the other hand, the end product must meet very specific requirements. Since the requirements are frequently diametrically opposed, the common denominator found is insufficient. So far, these facts have considerably restricted the use of resonably priced water glass solutions as organic/inorganic systems.

In reaction systems containing a polyisocyanate and an aqueous water glass solution a stoichiometric NCO/OH ratio cannot be achieved so that the reaction proceeds in an uncontrollable manner. Therefore, the polyisocyanate cannot be expected to form in any way an organic polymer structure of any practical use. For this reason, the reaction of polyisocyanate in water glass solutions is of technical interest only in as far as gaseous $CO_2$ which can be considered as hardener and coagulant for the water glass is released when R—NCO and water react with each other. The low molecular urea product resulting from the polyisocyanate remains distributed in the mineral structure of the water glass as hard filler in the form of very fine particles.

In practical formulation, another problem arises from the excess amount of gaseous $CO_2$. DE-A-17 70 384, for instance, see page 6, lines 9 to 14, already points out the necessity to observe the stoichiometric ratio of the reactants as much as possible. However, it does not indicate how this is to be achieved.

Moreover, in connection with the stoichiometric ratio, only the R—NCO/OH ratio is considered. No thought is given to the importance of a reaction ratio of $Me_2O/SiO_2/CO_2$—defined in whatever way. The next aspect pointed out is that with a higher polyisocyanate portion, the reaction proceeds rapidly and also tends to froth up. In view of these facts, the utility of the products obtainable according to said publication is considerably restricted.

From the mold manufacture where molds from sand and sodium water glass are prepared, it is known that an excess amount of gaseous $CO_2$ used to harden water glass will adversely influence the stability of the molding composition. This is an effect which occurs in a reaction mixture with water glass on account of a high excess amount of polyisocyanate.

In DE-A-24 60 834, a catalyst which is capable of trimerizing polyisocyanate in a manner known per se is added to the reaction mixture water glass/polyisocyanate. However, the process described in said application merely serves to prepare organomineral foams. DE-A-24 60 834 does not give clear teaching as to the amount of catalyst to be used; in the examples using 2,4,6-tris-(dimethylaminomethyl)-phenol as catalyst and polyphenolpolymethylenepolyisocyanate with an NCO-group content of about 28%, said catalyst is used in an amount of about 18 to 36 mmole per mole of NCO groups. In the case of other catalysts or polyisocyanates the ratio is even substantially higher.

It is the primary object of the invention to provide new organomineral products of polyisocyanates and water glass solutions, which products show high mechanical strength.

It is a further object of the invention to provide new orgnomineral products of polyisocyanates and water glass solutions, which show high mechanical strength, especially tensile bending strength while retaining the broad spectrum of advantageous physical properties of the known organomineral products.

It is still another object of the invention to provide new organomineral products which, in addition to the above-mentioned advantageous properties, are inexpensive.

These and other objects and advantages of the invention will become apparent to those skilled in the art from the following description.

SUMMARY OF THE INVENTION

The problem unerlying the invention is solved by the surprising finding that when using a defined amount of specific catalysts, based on the amount of NCO groups present, it is possible to obtain an organomineral product wherein an organic structure and an inorganic structure are three-dimensionally interwoven in such a manner that no volume expansion takes place during the reaction and the end product therefore is a dense, high-strength interpermeated or interpenetrated network.

If a defined amount of a polyisocyanate-trimerization catalyst is added to the reaction mixture of polyisocyanate and water glass solution, on the one hand, the amount of gaseous $CO_2$ necessary for optimally curing the inorganic portion of the mixture is formed, while on the other hand, the polyisocyanate is trimerized sufficiently to build up an organic structure. Thus, an interwoven inorganic and organic three-dimensional structure possessing excellent mechanical strength is formed.

Consequently, the invention relates to high-strength organomineral obtainable by reacting polyisocayanates and aqueous alkali silicate solutions in the presence of a catalyst prompting the trimerization of the polyisocyanate, the products being characterized in that, in their manufacture, considering the composition and amount of the aqueous alkali silicate solution, in relation to the amount of polyisocyanate, the catalyst is used in such an amount per mole of NCO-groups in the reaction mixture that interwoven networks of inorganic and organic polymer are formed during the reaction.

It has been found that surprisingly, polyisocyanates can be induced to substantially trimerize in aqueous, alkaline $SiO_2$-bearing solutions. In this process, the NCO/water reaction is largely suppressed with the result that gaseous $CO_2$ is formed in an amount that can be controlled by the formulation and optimally used for the reaction with the water glass. During the reaction, two interwoven polymer structures are simultaneously formed.

In the first reaction step, part of the polyisocyanate reacts with the water to give polyurea, while releasing gaseous $CO_2$. The $CO_2$ formed in situ reacts instantaneously with the $Me_2O$ portion of the water glass solution to give $Me_2CO_3 \cdot xH_2O$ (Me is an alkali metal, in particular sodium or potassium). By binding $Me_2O$ from the water glass solution, the $SiO_2$ portion is induced to form polysilicic acid. In the reaction, substantial amounts of heat are released with the result that in the subsequent step a specific furthher portion of the polyisocyanate can undergo the trimerization reaction. Products trimerized for the first time undergo at least in part a further trimerization and thus, a branched high molecular polymer structure can form.

BRIEF DESCRIPTION OF THE DRAWING

In the attached drawing, FIG. 1 shows the relationship between the molar ratio of the catalyst/NCO groups in the reaction mixture and the tensile bending strength of the products, while FIG. 2 illustrates the relationship between the NCO/$SiO_2$ molar ratio in the reaction mixture and the tensile bending strength of the products.

DETAILED DESCRIPTION OF THE INVENTION

Figure 1:
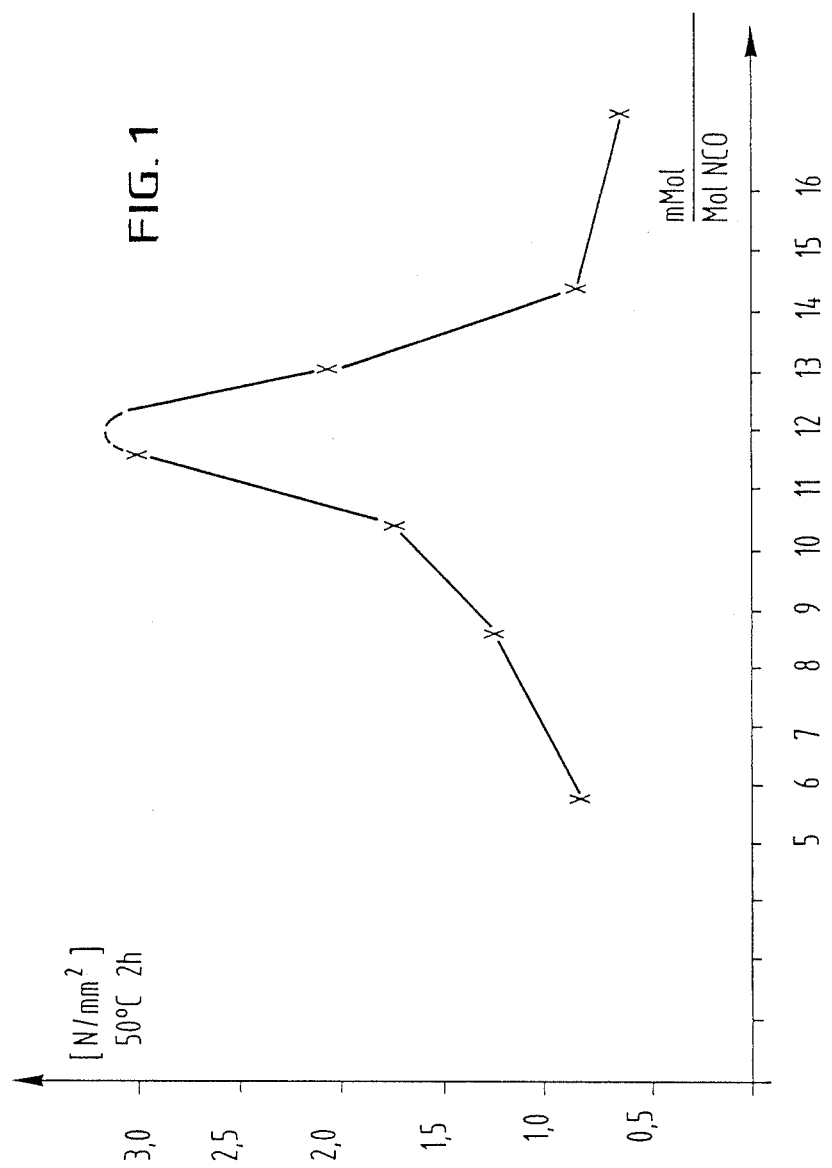

The components of the reaction mixture required in the preparation of the organomineral products of the invention are a water glass solution, a polyisocyanate and a catalyst suitable for trimerizing polyisocyanates. To achieve organomineral products of high strength, it is necessary to fix the molar ratio of catalyst/NCO groups within precisely defined limits.

The organomineral products can be prepared using the aqueous alkali silicate solutions commonly used in this technical field, for instance the water glass solutions described in EP-B-0 000579 and in DE-A-24 60 834. Because of their easy availability and low viscosity, sodium water glasses are preferred. Sodium water glasses with a relatively high solids content advantageously ranging from about 40 to 60, and in particular from about 46 to 52 weight percent of inorganic solids are used preferably. In theory, higher concentrated water glass solutions are also suitable and can be used for the purposes of the invention. However, since they have too high a viscosity entailing processing problems, such water glass solutions are of no practical importance.

Preferably, the molar ratio of $SiO_2$ to $Me_2O$ in the water glass solution used is relatively high and advantageously lies in the range of from about 2.09 to 3.44. The range of from about 2.48 to 3.17, and in particular of from 2.70 to 2.95 is especially preferred.

An $Me_2O$ content within the limits indicated above, promotes the formation of a three-dimensional inorganic silicic acid structure.

In a range where the $Me_2O$ portion is smaller than indicated above, the water glass is highly viscous and therefore presents difficulties in processing. Even very small amounts of reaction $CO_2$ are sufficient to cause the water glass to precipitate and inhomogeneities in the mixing result in products with unsatisfactory properties.

If the $Me_2O$ ratio substantially exceeds the indicated range, a high portion of reaction $CO_2$ is required in the formulation for the water glass portion to cure completely. However, this high portion is only obtainable by reducing the amount of the trimerization product. As a consequence, the ratio of urea product/trimerization product is shifted towards the urea whereby the amount of trimerization product contained in and reinforcing the end product is reduced. This also leads to unsatisfactory results.

To obtain a product with optimal strength it is necessary to consider the composition and amount of the water glass in determining the amount of catalyst. Organomineral products with excellent tensile bending strength are in particular obtained according to the invention if the polyisocyanate and the water glass solution are used in an NCO/$SiO_2$ molar ratio of 0.8 to 1.4, preferably 0.85 to 1.15. an NCO/$SiO_2$ molar ratio of about 1.0 is especially preferred.

As already mentioned, it is preferred to use concentrated water glass solutions so as to prevent the products from having too high a water content which would adversely affect their strength characteristics. Moreover, if the reaction mixture is too much diluted, the released-heat amount may not be sufficient to initiate the trimerization reaction. The lower limit of the water glass portion is predetermined by the fact that its amount must be sufficient to allow the formation of the inorganic structure. For this purpose, at least about 0.2, preferably at least about 0.5 parts by weight of water glass per part by weight of polyisocyanate are necessary. The upper limit of the permissible water glass portion in a given water glass composition is being arrived at if the amount of $CO_2$ released is no longer sufficient to bind the $Me_2O$ portion of the water glass. Then, in the same way as in the case of too high a water content, complete curing is no longer possible. In the case of sodium water glass 48/50 having a molar ratio of $SiO_2$/$Me_2O$ of about 2.85, the upper limit of the water glass content is for instance about 1.6 to 1.7 parts by weight of water glass per part by weight of polyisocyanate. When water glasses having a different composition are used, the limit value may differ from the indicated ones.

The organomineral products of the invention can be prepared using the polyisocyanates commonly employed in this technical field, for instance the compounds mentioned in EP-B-0000579 and in DE-A-24 60 834. Moreover, NOC preadducts, as are known in the preparation of polyurethanes and described in DE-A-24 60 834 are also suitable.

Polyisocyanates which easily undergo a trimerization reaction to form a three-dimensional organic structure are preferred in the preparation of the organomineral products of the invention. Said polyisocyanates are compounds in which, if possible, the NCO groups participating in the reaction are not at all sterically hindered. A specific example of such a sterically polyisocyanate is 4,4'-diphenylmethane diisocyanate (also in the form of the phosgenation product of aniline formaldehyde condensates (crude MDI)).

The polyisocyanates used according to the invention preferably contain about 10 to 55% of NCO groups, based on the mass of the polyisocyanate. Polyisocyanates containing 24 to 34, and in particular 28 to 32 weight percent are especially preferred. A smaller content of NCO groups in the polyisocyanate will render the formation of a three-dimensional organic structure more difficult. On the other hand, with a higher NCO content, it can easily happen that too much gaseous $CO_2$ is released, which may result in an overcuring of the inorganic portion of the product.

The third coompent required in the preparation of the organomineral products of the invention is a catalyst capable of catalyzing the trimerization of the polyisocyanate component. Suitable catalysts are the trimerization catalysts known in polyurethane chemistry which are preferably tertiary amines and amino alcohols. Specific examples of suitable trimerization catalysts are 2,4,6-tris-(dimethylaminomethyl)-phenol, and other Mannich base products exhibiting the structural element

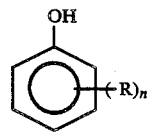

wherein R is a residue of the formula

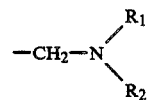

n is 1 to 3 and the residues R are in the ortho or para position. $R_1$ and $R_2$ may be the same or different and represent $C_{1-4}$-alkyl, preferably methyl, or $C_{1-4}$-hydroxyalkyl, preferably hydroxymethyl groups.

Mixtures of the above-mentioned catalysts may also be used.

In the preparation of the organomineral products of the invention, the molar ratio of the catalyst to the NCO groups in the reaction mixture is critical, since products of high mechanical strength and density can only be obtained in a relatively narrow range. This ratio is determined by the following criteria, considering the composition and amount of the water glass used:

(a) The amount of catalyst must be sufficient to catalyze the trimerization reaction necessary for the formation of the organic structure.

(b) The amount of catalyst must not be so high as to prompt an uncontrolled, strong exothermic reaction, as too much $CO_2$ would thus be formed and the water would evaporate causing the reaction mixture to froth up and resulting in products insufficient in strength.

If the composition and the amount of water glass solution are specified according to the invention, the ratio usually is 6.0 to 14.5, preferably 8.5 to 13.8, and in particular 10.2 to 13.3 mmole of catalyst per mole of NCO groups in the reaction mixture.

If the amount of catalyst is lower than the range indicated, a three-dimensional polymeric structure will no longer sufficiently form. On the other hand, too high a catalyst amount will result in insufficient curing of the inorganic portion and as a consequence of the strong exothermic reaction, some expansion of the product will occur.

A cocatalyst may be used to further control the trimerization reaction. Said cocatalyst may for instance consist of a trivalent iron compound, such as $FeCl_3$, as is frequently contained in the various technical polyisocyanates due to the manufacturing process. The other cocatalysts which are known per se are also suitable, i.e. trialkylphosphanes, such as trimethylphospholine, alkali metal salts of carboxylic acids, such as sodium acetate or sodium maleate or transition metal compounds, such as $Sb_2O_3$, $ZrOCl_2$, $SbCl_5$ or $CuCl$.

Organomineral products with especially favourable physical properties are obtained by the inventive process if polyisocyanate and water glass are used in such an amount and composition that the mentioned preferred ratio of catalyst amount to NCO groups occurs together with the preferred $NCO/SiO_2$ ratio also mentioned and moreover, the catalyst is present in such an amount that the $CO_2$ amount formed is just sufficient for the $Me_2O$ portion of the water glass to precipitate completely.

These conditions are satisfied by orgaomineral products which have been prepared using the catalyst in an amount of 6.0 to 14.5, preferably 8.5 to 13.8, and in particular 10.2 to 13.3 mmole per mole of NCO groups and the polyisocyanate and the alkali silicate solution in an $NCO/SiO_2$ molar ratio of 0.8 to 1.4, preferably 0.85 to 1.15. The water glass should have the usual, preferred composition, that is an $SiO_2/Me_2O$ molar ratio of 2.09 to 3.44, preferably 2.48 to 3.17.

To prepare high quality organomineral products, it is desirable for the catalyst to be evenly distributed in the reaction mixture while the polyisocyanate and water glass solution react with each other. The catalyst is usually added to the water glass solution. However, so fat it has not been possible to obtain a stable dispersion, as the mixture dehomogenizes when it is allowed to stand.

It has now been found that the tendency to dehomogenize can be reduced or prevented by adding antimony trioxide to the catalyst-containing mixture. This way, the catalyst can be maintained in dispersion. This finding is independently of the amount of catalyst added, that is the advantageous effect of the addition of antimony trioxide presents itself not only in the teaching of the present invention, but in general in processes for producing organomineral products from polyisocyanates and water glass solutions using trimerization catalysts. The antimony trioxide is used in an amount of about 5 to 100, preferably 20 to 50, and in particular 30 to 40 weight percent, based on the amount of the catalyst.

In principle, the preparation of the preferred non-expanded organomineral products of the invention does not require the addition of a blowing agent to the reaction mixture. However, depending on the particular formulation and the other reaction conditions, a precisely dosed amount of blowing agent may be added. This amount is small enough not to bring about an expansion of the product during polymerization.

Substances suitable for this purpose are volatile substances which are present in liquid state at room temperature and which, when the water glass reacts with the polyisocyanate, evaporate because of the heat released. Examples of suitable volatile substances are monofluorotrichloromethane, dichlorodifluoromethane and trichlorotrifluoroethane.

Preferably, the amount of volatile substance added is at most 3.5 weight percent, based on the total mass of the reaction mixture. Most preferably, the volatile substance content of the reaction mixture is 1 to 2.8 weight percent. Such a small amount does not cause the product to expand (froth up) during the reaction. Rather, the volatile substance escapes practically completely from the reaction mixture at the beginning of the reaction, leaving various voids and channels which can take up the alkali carbonate solution that is produced by the reaction and remains in the reaction mixture. Moreover, this mechanism contributes to the extraordinary mechanical strength of the resulting product.

Moreover, nucleating and stabilizing substances may be added to the reaction mixture. Suitable nucleating substances are for instance finely divided solids, such as silicon dioxide or aluminum oxide, optionally used together with zinc stearate, amorphous silicic acids or metal silicates. Of these, the preferred nucleating agent is silicon dioxide precipitated from the colloidal water glass solution.

Suitable stabilizers are silicon oils on the basis of polysiloxanes. They may be added in an amount of about 0.5 to 2, and in particular 0.8 to 1.4 weight percent, based on the total amount of the reaction mixture.

Depending on the desired properties of the organomineral products, further additives may be incorporated into the reaction mixture. Such additives for instance include organic compounds having groups which are reactive to isocyanate groups. Examples of these compounds are polyols, such as polyester and polyether polyols as well as phosphonate esters, such as tri-$\beta$-chloroethyl-phosphonate or tri-$\beta$-isopropyl-phosphonate which are known in polyurethane chemistry. The amount of the polyols added is to be so small that it does not adversely affect the formation of a three-dimensional organic structure and an inorganic structure interwoven therewith. Expediently, polyol or phosphonate ester are therefore added in amounts of at most 2 to 45, preferably 10 to 20 weight percent, based on the isocyanate component.

Flame-inhibiting or flame-retarding substances may be added to the reaction mixture to reduce the inflammability of the organomineral product of the invention. Suitable substances are the flame-inhibiting or flame-retarding substances known in the plastics chemistry, such as phosphates and borates. The flame-inhibiting substances may be added in amounts ranging from 2 to 30 weight percent, based on the isocyanate component.

Furthermore, fillers may be added to the reaction mixture in order to achieve a further reinforcement of the products. Examples of suitable fillers are diatomaceous earth, aluminum oxide hydrate, magnesium silicate, asbestos powder, chalk, asbestos fibers and glass fibers. The amount of fillers added mainly depends on the viscosity of the mixture. Preferably, it lies within the range of 0.1 to 30 weight percent, based on the weight of the water glass solution used.

If desired, pigments or dyestuffs may also be added to the reaction mixture.

In the manufacture of the organomineral products of the invention it is preferred to first prepare two components (A) and (B). The component (A) consists of the water glass solution and contains both the catalyst and the compound wherein the catalyst is being maintained in dispersion, as well as the polyol, the flame-inhibiting additives, the fillers and the dyestuffs. The component (B) consists of the polyisocyanate and optionally contains the cocatalyst and optionally the volatile substance and the stabilizer. This component may also contain fillers which are compatible with the mentioned components and other additives mentioned. Since the antimony trioxide being a suitable dispersant for the catalyst it is likewise a useful cocatalyst which can alternatively be contained in component (A).

In preparing the organomineral products, the components (A) and (B) are carefully mixed. The starting time of the resulting mixtures in general is between 5 and more than 100 seconds and can be controlled as desired. Optionally, the components or the mixture may be heated or cooled in order to adjust the starting time to the requirements.

The reaction of the mixture starts with the reaction of the NCO groups with the water of the water glass solution, whereby polyurea and gaseous $CO_2$ are formed. This reaction is exothermic and, on the one hand, prompts the evaporation of the volatile substances and on the other hand, under the influence of the catalyst, starts the trimerization of the NCO groups that have remained. The released $CO_2$, in turn, reacts with the $Me_2O$ of the water glass to give alkali metal carbonate, whereby the $Me_2O$ component is eliminated from the water glass solution. In the course of the reaction, the remaining silicic acid forms a three-dimensional inorganic structure which binds to the simultaneously evolving organic polymer to form an "interpermeated network" of high strength. The alkali carbonate solution remaining in the "channels" produced by the escaping volatile substance contributes by increasing the strength.

In view of their excellent mechanical and physical properties, especially in view of their high strength and the fact that the manufacturing process is not adversely affected by water, the organomineral products of the invention lend themselves to many fields of application, they may, for instance, be used as construction, coating, sealing or insulating materials or putty or adhesive. The materials may be applied by immersion or may be injected, sprayed on, rolled on or painted on etc.

The invention is illustrated by the examples.

EXAMPLE 1

A reaction component A containing the following substances in the indicated amounts is prepared:

| Component | weight % |
| --- | --- |
| Sodium water glass 48/50 | 94.48 |
| $Sb_2O_3$ | 0.58 |
| 2,4,6-tris-(dimethylamino-methyl)-phenol | 1.50 |
| Water | 3.44 |

Separately, a reaction component B is prepared from the following components

| Component: | weight % |
| --- | --- |
| Polyphenylpolymethylene-polyisocyanate with an NCO portion of about 31 weight % | 93.00 |
| Trichlorofluoromethane | 5.00 |
| Stabilizer | 2.00 |

When mixing the two reaction components in a weight ratio of A:B=4:3 (11.36 mmole of catalyst per mole of NCO groups) gelling starts after about 1 minute. A temperature rise is observed after 2 minutes and the mixture cures into an organomineral product.

To test the tensile bending strength of the product, two stones spaced 5 mm apart are held in a fixed position by a scotch linen tape fastened to the front sides. After having been intensely stirred with a wooden rod, the mixture of the reaction components is cast bubble-free into the gap between the stones shortly before gelling starts.

The tensile bending strength of the structure fastened in this way is measured
(a) after 2 hours at 20° C.
(b) after 2 hours at 50° C. (structure in the drying cabinet)
(c) after 8 days at 20° C.
(Device for measuring the flexural tensile strength: Chemische Laboratorien for Tonindustry (chemical laboratories for the clay industry), Prof. Dr. H. Seger and E. Cramer, Berlin). The values obtained are given in Table I.

EXAMPLES 2 TO 5 AND COMPARATIVE EXAMPLES 1 AND 2

The reaction components A and B are mixed in the ratios indicated in Table I. Moreover the Table also shows the mmole catalyst/mole NCO ratio and the NCO/$SiO_2$ molar ratio that present themselves in the respective mixing ratios. In each case the tensile bending strength is tested in the manner indicated in example 1. The results are compiled in Table I. In FIG. 1 the ratio of mmole catalyst/mole NCO is graphically shown, while FIG. 2 is a graph of the mole NCO/mole $SiO_2$ ratio.

TABLE I

| Example No. | Ratio A:B | mmole catalyst per mole NCO | $\frac{\text{mole NCO}}{\text{mole SiO}_2}$ | Tensile 2h 50° C. | bending 2h 20° C. | strength [N/mm$^2$] 8d 20° C. |
| --- | --- | --- | --- | --- | --- | --- |
| 1 | 1.3 | 11.36 | 1.00 | 3.3 | 0.89 | 8.10 |
| 2 | 1.2 | 10.38 | 1.10 | 1.59 | 0.83 | 7.05 |
| 3 | 1.0 | 8.65 | 1.32 | 1.23 | 0.78 | — |
| 4 | 1.5 | 12.97 | 0.88 | 2.07 | 0.82 | — |
| 5 | 1.6 | 14.4 | 0.82 | 0.81 | 0.80 | — |
| Comp. Ex. 1 | 0.6 | 5.77 | 2.20 | 0.76 | 0.88 | 3.8 |
| Comp. Ex. 2 | 2.0 | 17.3 | 0.66 | 0.56 | 0.76 | |

I claim:

1. A method of coating, glueing, sealing or insulating, whereby the material to be coated, glued, sealed or insulated is brought in contact with a mixture of a polyisocyanate and an aqueous alkali silicate solution in the presence of a catalyst prompting the trimerization of the polyisocyanate, characterized in that, considering the composition and amount of the aqueous alkali silicate solution, in relation to the amount of the polyisocyanate, the catalyst is used in such an amount per mole of NCO groups in the reaction mixture that interwoven networks of inorganic and organic polymer are formed during the reaction.

* * * * *